(12) United States Patent
Harada et al.

(10) Patent No.: US 7,891,959 B2
(45) Date of Patent: Feb. 22, 2011

(54) PISTON PUMP

(75) Inventors: Tomoo Harada, Anjo (JP); Junichi Maeda, Kariya (JP)

(73) Assignee: Advics Co., Ltd., Kariya, Aichi Pref. (JP)

( * ) Notice: Subject to any disclaimer, the term of this patent is extended or adjusted under 35 U.S.C. 154(b) by 588 days.

(21) Appl. No.: 11/348,251

(22) Filed: Feb. 7, 2006

(65) Prior Publication Data

US 2006/0177326 A1 Aug. 10, 2006

(30) Foreign Application Priority Data

Feb. 10, 2005 (JP) ............................. 2005-034920
Oct. 21, 2005 (JP) ............................. 2005-307528

(51) Int. Cl.
*F04B 37/00* (2006.01)
*F04B 53/12* (2006.01)

(52) U.S. Cl. ..................... 417/470; 417/549; 417/554

(58) Field of Classification Search ................ 417/470, 417/549, 313, 554, 555.1, 559
See application file for complete search history.

(56) References Cited

U.S. PATENT DOCUMENTS

| | | | |
|---|---|---|---|
| 4,462,302 A * | 7/1984 | Hertell | ......................... 92/248 |
| 5,823,639 A | 10/1998 | Zinnkann et al. | |
| 6,224,352 B1 * | 5/2001 | Hauser et al. | ............... 417/313 |
| 6,276,909 B1 | 8/2001 | Siegel et al. | |
| 6,283,733 B1 * | 9/2001 | Merklein et al. | ............. 417/549 |
| 6,457,956 B1 | 10/2002 | Hauser et al. | |
| 6,589,032 B2 * | 7/2003 | Summers et al. | ............ 417/549 |

FOREIGN PATENT DOCUMENTS

JP 2000-145990 A 5/2000
JP 2003-500610 1/2003

OTHER PUBLICATIONS

Chinese Official Action and English Language Translation of Chinese Official Action.

* cited by examiner

*Primary Examiner*—Charles G Freay
*Assistant Examiner*—Alexander B Comley
(74) *Attorney, Agent, or Firm*—Buchanan Ingersoll & Rooney PC

(57) ABSTRACT

A piston pump includes a pump housing having a suction port and a discharge port. A piston is mounted in a bore of the pump housing and forms a pump chamber. Suction and discharge valves are provided on the opposite sides of the pump chamber, respectively. The suction valve includes a retainer which is mounted on the piston and has a valve bore which communicates with the suction port, a valve seat which is formed at the pump chamber end of the valve bore, and a valve body holding portion and a spring holding portion. The suction valve also includes a valve body which can seat and unseat from the valve seat and which is received and held by the valve body holding portion, and a spring which is received and held by the spring holding portion and biases the valve body towards the valve seat.

5 Claims, 14 Drawing Sheets

PISTON PUMP

BACKGROUND OF THE INVENTION

1. Field of the Invention

The present invention relates to a piston pump such as a piston pump used as a pump of a brake apparatus for a vehicle.

2. Description of the Related Art

An example of the type of piston pump to which the present invention relates is disclosed in Japanese Kohyo (PCT) Patent Publication No. 2003-500610. Such a piston pump typically has a piston which is installed in a bore of a pump housing which has a suction port and a discharge port and forms a pump chamber. The piston increases and decreases the volume of the pump chamber by reciprocating in the axial direction. A suction valve is provided on the piston and disposed in an inflow passage connecting the suction port and the pump chamber. The suction valve opens when the volume of the pump chamber is increasing and closes when the volume is decreasing. A discharge valve is provided on the discharge side of the pump chamber and disposed in an outflow passage connecting the discharge port and the pump chamber. The discharge valve opens when the volume of the pump chamber is decreasing and closes when the volume is increasing. Liquid flows from the suction port to the discharge port as the volume of the pump chamber increases and decreases due to reciprocating movement of the piston in the axial direction.

In the above-described piston pump, the suction valve has a valve bore provided in the piston (communicating with the suction port) and a valve seat (formed in the end portion of the valve bore closest to the pump chamber), a cylindrical retainer which is installed on the piston, a valve body which is installed inside the retainer and can seat or unseat with respect to the valve seat, and a spring which is installed between the valve body and the retainer and which biases the valve body towards the valve seat.

SUMMARY OF THE INVENTION

In such a piston pump, the valve bore and the valve seat for the suction valve are formed in the piston, so it is necessary to mount the retainer, the valve body, and the spring on the piston in order to form the suction valve. Therefore, the suction valve cannot be formed independently from the piston, so there is room for improving the easy of assembly of the suction valve. Accordingly, the object of the present invention is to make it possible for a suction valve of a piston pump to be fabricated in the form of a subassembly separate from a piston to thereby improve the ease of assembly of the suction valve.

The present invention provides a piston pump which includes a pump housing having a suction port and a discharge port, a piston which is mounted in a bore of the housing and which forms a pump chamber and increases and decreases the volume of the pump chamber by reciprocating in the axial direction, a suction valve which is provided on the piston and is disposed in an inflow passage connecting the suction port with the pump chamber and which opens when the volume of the pump chamber is increasing and closes when the volume is decreasing, and a discharge valve which is provided on the discharge side of the pump chamber and which is disposed in an outflow passage connecting the discharge port with the pump chamber and which opens when the volume of the pump chamber is decreasing and closes when the volume is increasing, liquid flowing from the suction port towards the discharge port when the piston is reciprocated in the axial direction and the volume of the pump chamber is increased and decreased. The suction valve comprises a retainer which is mounted on the piston and which has a valve bore which communicates with the suction port, a valve seat which is formed on the end portion of the valve bore closest to the pump chamber, and a valve body holding portion and a spring holding portion which are connected to and integrally formed with the valve seat. The suction valve further includes a valve body which is received and held by the valve body holding portion of the retainer and can seat and unseat with respect to the valve seat, and a spring which is received and held by the spring holding portion and which biases the valve body towards the valve seat.

In this piston pump, the retainer which is mounted on the piston has a valve bore and a valve seat for the suction valve, and a valve body holding portion and a spring holding portion which are connected to and integrally formed with the valve seat. A valve body is received in and held by the valve body holding portion so as to be able to seat and unseat from the valve seat, and a spring which biases the valve body towards the valve seat is received and held in the spring holding portion. As a result, the valve body can be fabricated separately from the piston by inserting the valve body and the spring into the retainer, whereby the suction valve can be fabricated in the form of a subassembly, and the ease of mounting the suction valve in the pump can be improved.

The valve body holding portion and the spring holding portion of the retainer may comprise a plurality of axially-extending column-shaped members. Tapered portions which engage with one end portion of the spring and prevent the spring from coming loose from the retainer can be formed on the end portions of the column-shaped members. This structure makes it possible to improve moldability when forming the retainer by resin molding and to increase the ease of removing the retainer from a mold.

The spring may be a coil spring having a cylindrical shape. The inner diameter of the column-shaped members as measured at the larger diameter ends of the tapered portions formed on the end portions of the column-shaped members can have a diameter which is smaller by a prescribed amount than the outer diameter of the end portion of the coil spring in a state before the valve body and the coil spring are installed in the retainer. With this structure, the end portions of the column-shaped members are elastically deformed in the radially outward direction when the coil spring is mounted on the column-shaped members of the retainer. As a result, the end portions of the column-shaped members press the end portion of the coil spring in the radially inward direction from the outer periphery towards the inner periphery thereof with an elastic restoring force. Accordingly, the coil spring is held by the retainer with certainty and is prevented from coming loose from the retainer.

The valve body holding portion and the spring holding portion of the retainer may comprise a plurality of axially-extending column-shaped members, and latching portions which engage with an end portion of the coil spring and prevent the spring from coming loose from the retainer can be formed on the end portions of the column-shaped members. With this structure, the holding force exerted by the retainer on the spring can be increased, and the spring can be effectively prevented from coming loose from (falling off) the retainer.

In one preferred embodiment, the suction valve includes a pair of column-shaped members, and each column-shaped member is formed in the shape of a block C which is divided into two portions towards the valve seat. The number of column-shaped members may be an even number greater than or equal to 4. The column-shaped members can be divided into two groups, with the end portions of the column-shaped members in a group being connected to each other. With this structure, moldability when the retainer is prepared by resin molding and the ease of removing the retainer from a mold can be improved, the stiffness of the column-shaped members can be increased, and their holding ability can be increased.

Each group of column-shaped members whose end portions are connected together forms a three-dimensional body which becomes narrower towards its end than at its base portion. With this structure, compared to when the body formed by connecting the column-shaped members to each other has a two-dimensional shape (plate-like shape), the stiffness of the body defined by the group of column-shaped members can be increased, it can be made more difficult to elastically deform the end portions of the column-shaped members in the radially outwards direction, and the force with which the end portions of the column-shaped members hold the spring can be increased.

A tapered portion which increases in diameter towards the pump chamber can be formed on the inner periphery of the end portion of the retainer on the pump chamber side of the retainer. With this structure, it is possible to improve the mountability (insertability) of the valve body and the spring with respect to the retainer.

An annular lip seal which prevents flow of liquid from the pump chamber towards the outer periphery of the piston can be formed in the outer periphery of the retainer. With this structure, the number of components of the piston pump including the suction valve can be reduced.

A receiving portion for a piston return spring which returns the piston can be formed on the outer periphery of the retainer closer to the pump chamber than is the lip seal. With this structure, interference between the piston return spring and the lip seal can be prevented, and the performance of the lip seal can be guaranteed.

An axially extending narrow groove may be formed on the valve seat of the retainer to run along the surface of the valve seat. In addition, an axially extending narrow groove may be formed on the outer periphery of the lip seal of the retainer to run along the outer surface of the lip seal. With this structure, at the time of removing air (at the time of drawing a vacuum) when filling the piston pump with liquid, air remaining in the pump chamber can be removed through the narrow groove.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF PREFERRED EMBODIMENTS

Figure 1:
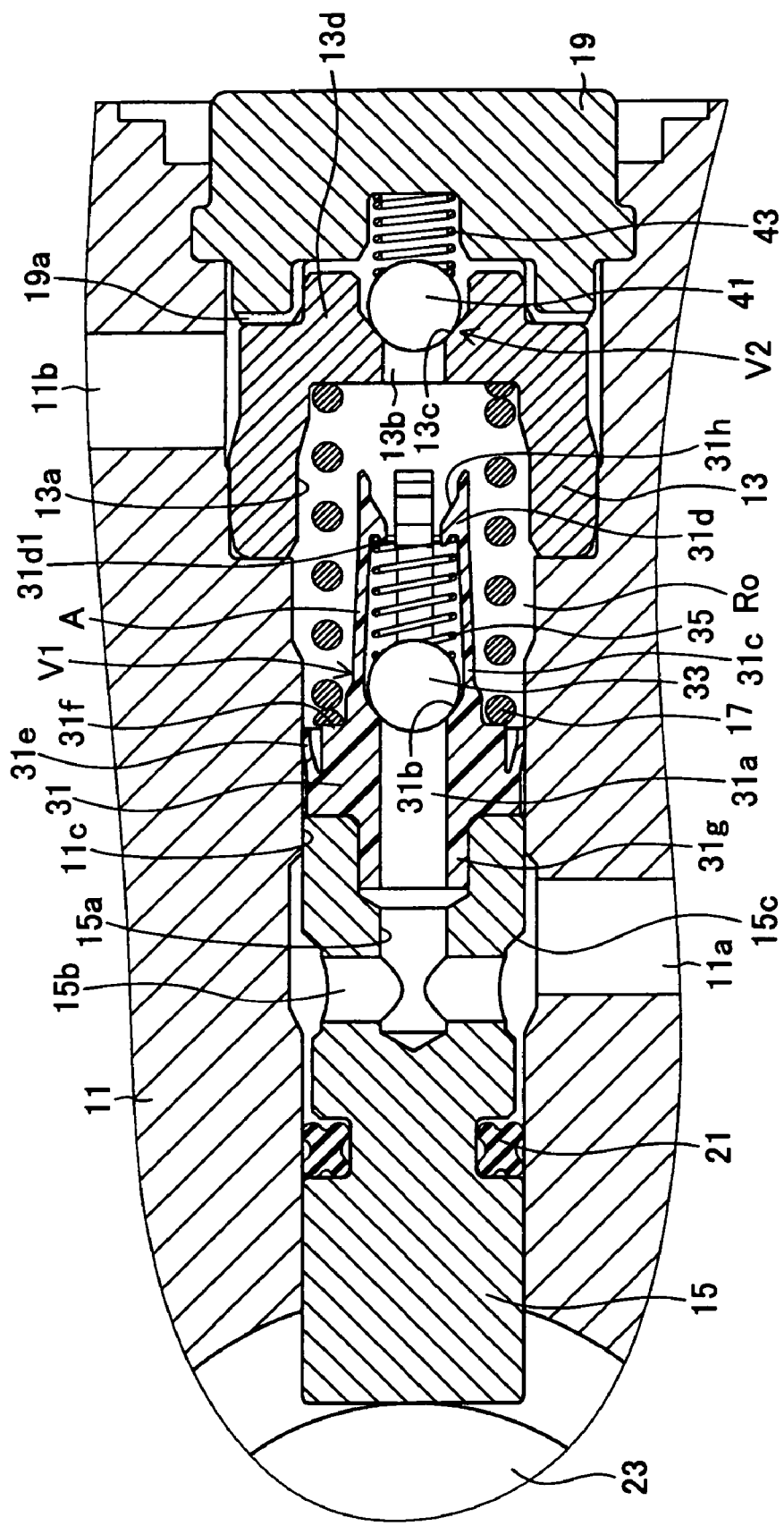
FIG. 1 is a longitudinal cross-sectional view of a first embodiment of a piston pump according to the present invention.
Figure 2:
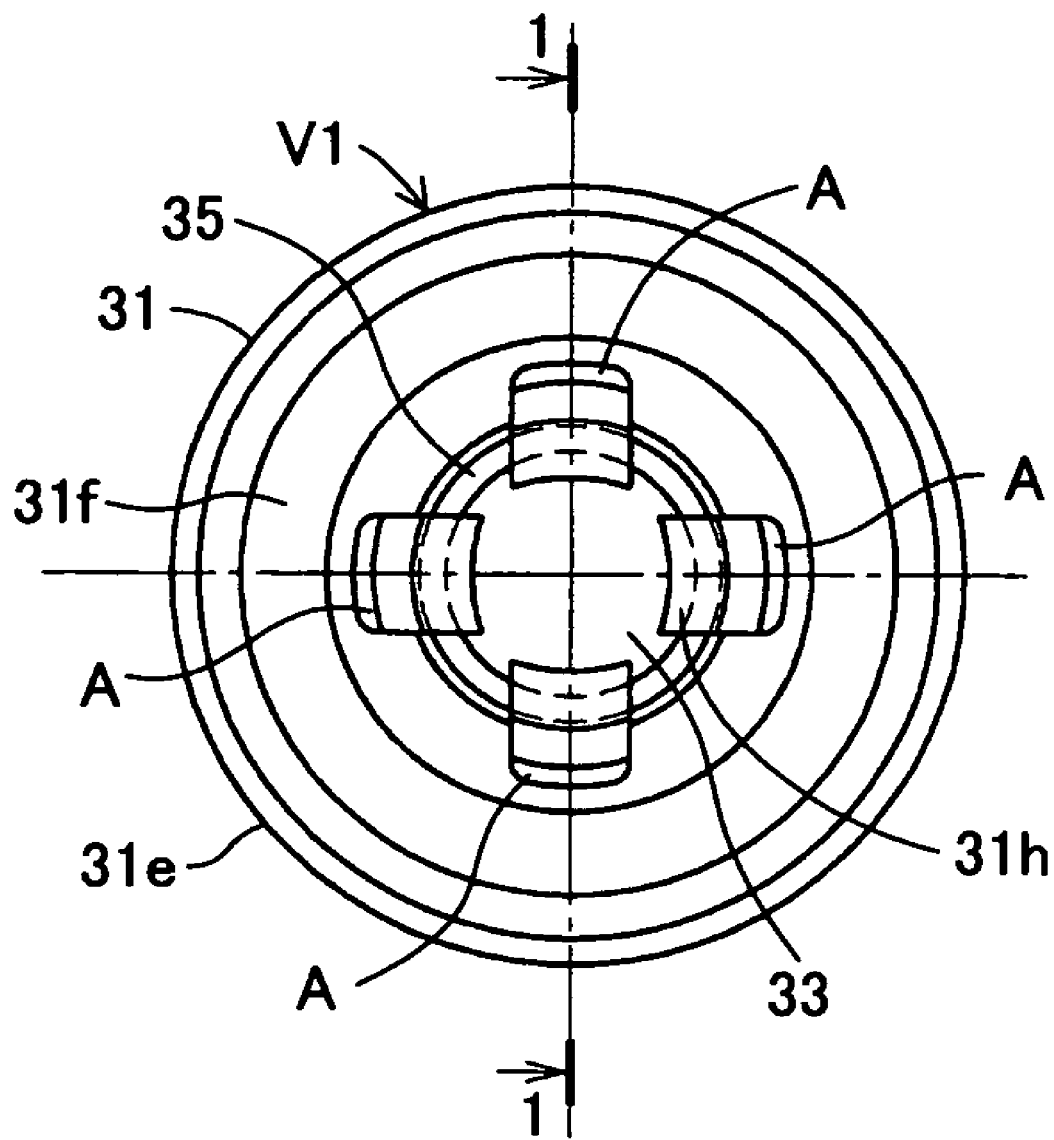
FIG. 2 is an enlarged elevation of the suction valve of FIG. 1 as seen from the pump chamber side, wherein line 1-1 indicates the plane along which the cross section shown in FIG. 1 is taken.

Below, a number of preferred embodiments of the piston pump according to the present invention will be explained based on the drawings. FIGS. 1 and 2 show a first embodiment of the piston pump according to the present invention. In this first embodiment, a cylinder member 13 and a piston 15 are mounted in a stepped bore 11c of a pump housing 11 having a suction port 11a and a discharge port 11b. A suction valve V1 and a discharge valve V2 are also mounted in the stepped bore 11c.

The cylinder member 13 has a tubular shape with a bottom. It includes a cylinder bore 13a and a bottom wall 13d in which a valve bore 13b and a valve seat 13c of the discharge valve V2 are formed. The cylinder member 13 is mounted in the stepped bore 11c of the pump housing 11 together with the piston 15, the suction valve V1, a piston return spring 17, and the discharge valve V2. They are held in place by a cap 19.

The piston 15 is disposed inside the small diameter portion of the stepped bore 11c of the pump housing 11 so as to be able to slide in the axial direction. It is equipped with a sealing ring 21 shown at the left end in FIG. 1 so as to form a liquid-tight seal. At its left end in FIG. 1, the piston 15 slidingly engages with the outer peripheral surface of an eccentric body 23 which is rotated by an electric motor (not shown). At its right end in FIG. 1, the piston 15 forms a pump chamber Ro together with the stepped bore 11c of the pump housing 11 and the cylinder bore 13a. The piston 15 decreases the volume of the pump chamber Ro when it moves in the axial direction against the biasing force of the piston return spring 17 due to the rotation of the eccentric body 23 and increases the volume of the pump chamber Ro when it moves backwards in the axial direction under the biasing force of the piston return spring 17.

A connecting hole 15a which extends in the axial direction, a connecting hole 15b which extends in the radial direction, and an annular groove 15c which communicates with the connecting hole 15b are formed in the piston 15. The axially extending connecting hole 15a is connected to a valve bore 31a formed in the retainer 31 of the suction valve V1. The radially extending connecting hole 15b is formed in the midportion of the piston 15. It is connected at its midportion to one end of the connecting hole 15a, and it is connected at both of its ends to the annular groove 15c. The annular groove 15c is connected to the suction port 11a of the pump housing 11.

In this example, the piston return spring 17 is a compression coil spring. It is disposed with a prescribed preloading between the cylinder member 13 and the retainer 31 of the suction valve V1 mounted on the piston 15. This piston return spring 17 biases the piston 15, the suction valve V1, and the like towards the eccentric body 23.

The suction valve V1 is mounted in a liquid-tight manner on the end of the piston 15 which faces the pump chamber Ro. It is disposed in an inflow passage connecting the suction port 11a and the pump chamber Ro. The suction valve V1 includes a retainer 31 made of a resin, and it also includes a ball valve body 33 and a spring 35. The suction valve V1 has a structure so as to open when the volume of the pump chamber Ro is increasing and so as to close when the volume is decreasing.

The retainer 31 has a valve bore 31a which is connected to the suction port 11a, a valve seat 31b which is formed on the end of the valve bore 31a closest to the pump chamber, a valve body holding portion 31c and a spring holding portion 31d which are connected to and integrally formed with the valve seat 31b, an annular lip seal 31e, and an annular receiving portion 31f. A cylindrical portion 31g at the left end of the retainer 31 in FIG. 1 is secured to the piston 15 by fitting into the connecting hole 15a of the piston 15 in a liquid-tight manner.

In this embodiment, the valve body holding portion 31c and the spring holding portion 31d comprise four column-shaped members A. The left end in FIG. 1 of each column-shaped member A functions as a valve body holding portion 31c, and the right end in FIG. 1 of each column-shaped member A functions as a spring holding portion 31d. A latching portion (hook) 31d1 which engages with one end portion of the spring 35 and prevents the spring 35 from coming loose (falling off) from the retainer 31 is formed at the right end in FIG. 1 of each column-shaped member A. The latching portions 31d1 function as a spring holding portion 31d. A tapered portion 31h which increases in diameter towards the pump chamber is formed on the inner periphery of the right end in FIG. 1 of each column-shaped member A, i.e., on the inner periphery of the end portion of the retainer 31 closest to the pump chamber.

The annular lip seal 31e is formed on the outer periphery of the retainer 31. It has a shape so as to prevent flow of liquid from the pump chamber Ro towards the outer periphery of the piston 15. The annular receiving portion 31f is formed on the outer periphery of the retainer 31 closer to the pump chamber than is the lip seal 31e. The annular receiving portion 31f can receive the piston return spring 17 for returning the piston 15.

A ball valve body 33 is previously mounted in the retainer 31 from the right side of the retainer 31 in FIG. 1. It is housed and held in the valve body holding portion 31c of the retainer 31 so as to be able to seat and unseat from the valve seat 31b. The spring 35 is inserted into the retainer 31 from the right side in FIG. 1 together with the ball valve body 33 (or after the ball valve body 33 has been inserted). The spring 35 is housed in and held by the spring holding portion 31d of the retainer 31. It biases the ball valve body 33 towards the valve seat 31b with a small load.

The discharge valve V2 is installed on the discharge end of the cylinder member 13, i.e., on the discharge side of the pump chamber Ro. It is disposed in an outflow passage connecting the discharge port 11b and the pump chamber Ro. The discharge valve V2 includes a ball valve body 41 which can seat and unseat with respect to a valve seat 13c formed in the bottom wall 13d of the cylinder member 13 and a spring 43 which is disposed between the ball valve body 41 and the cap 19 and biases the ball valve body 41 towards the valve seat 13c with a small load. The discharge valve V2 has a structure so as to close when the volume of the pump chamber Ro is increasing and so as to open when the volume is decreasing. A connecting groove 19a which leads liquid which has passed through the discharge valve V2 to the discharge port 11b is formed in the cap 19.

In this first embodiment having the above-described structure, due to the combined action of the eccentric body 23 and the piston return spring 17 when the eccentric body 23 is rotationally driven by an electric motor (not shown), the piston 15 is reciprocated in the axial direction, the volume of the pump chamber Ro is increased and decreased, and the suction valve V1 and the discharge valve V2 operate to enable liquid to flow from the suction port 11a towards the discharge port 11b.

In this first embodiment, the retainer 31 which is mounted on the piston 15 includes the valve bore 31a and the valve seat 31b of the suction valve V1, and the valve body holding portion 31c and the spring holding portion 31d which are connected to and integrally formed with the valve seat 31b. The ball valve body 33 is housed by the valve body holding portion 31c so as to be able to seat and unseat with respect to the valve seat 31b, and the spring 35 which biases the ball valve body 33 towards the valve seat 31b is received and held by the spring holding portion 31d. Therefore, by mounting the ball valve body 33 and the spring 35 in the retainer 31, the suction valve V1 can be formed independently from the piston 15. As a result, the suction valve V1 can be formed as a subassembly, and the mountability of the suction valve V1 can be improved.

In this first embodiment, the ball valve body 33 and the spring 35 can be mounted on the retainer 31 by pushing the ball valve body 33 and the spring 35 to the left in FIG. 1 into the space between the column-shaped members A after bringing the ball valve body 33 and the left end of the spring 35 in FIG. 1 into contact with the tapered portions 31h of the retainer 31. At this time, the tapered portions 31h of the retainer 31 guide the insertion of the ball valve body 33 and the spring 35 between the column-shaped members A, and the right ends in FIG. 1 of the column-shaped members A elastically deform so as to open by spreading outwards as they are pressed in the radially outward direction. As a result, the ease of mounting (ease of insertion) of the ball valve body 33 and the spring 35 on the retainer 31 can be increased.

In this first embodiment, the valve body holding portion 31c and the spring holding portion 31d of the retainer 31 comprise four column-shaped members A which extend in the axial direction, and latching portions 31d1 which engage with one end portion of the spring 35 and prevent the spring 35 from coming loose from the retainer 31 are formed at the end portions of the column-shaped members A. As a result, it is possible to increase the holding force exerted by the retainer 31 on the spring 35, and the spring 35 can be effectively prevented from coming loose from the retainer 31.

In this first embodiment, an annular lip seal 31e which prevents the flow of liquid from the pump chamber Ro towards the outer periphery of the piston 15 is formed on the outer periphery of the retainer 31. Therefore, it is possible to decrease the number of components of the piston pump including the suction valve V1. In addition, a receiving portion 31f for the piston return spring 17 for returning the piston 15 is formed on the outer periphery of the retainer 31 closer to the pump chamber than is the lip seal 31e. As a result, interference of the piston return spring 17 with the lip seal 31e is prevented, and the performance of the lip seal 31e can be guaranteed.

Figure 3:
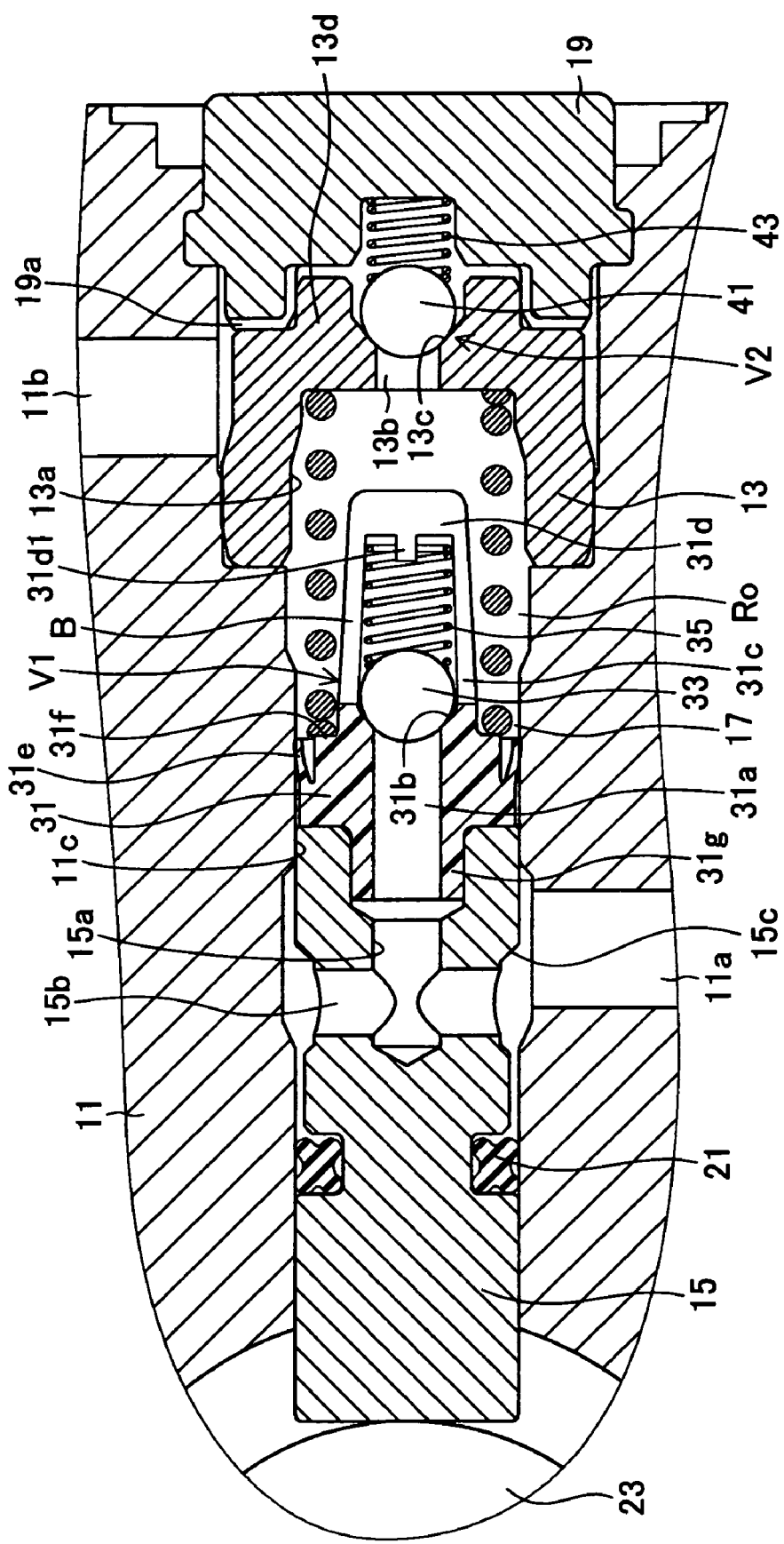
FIG. 3 is a longitudinal cross-sectional view of a second embodiment of a piston pump according to the present invention.
Figure 4:
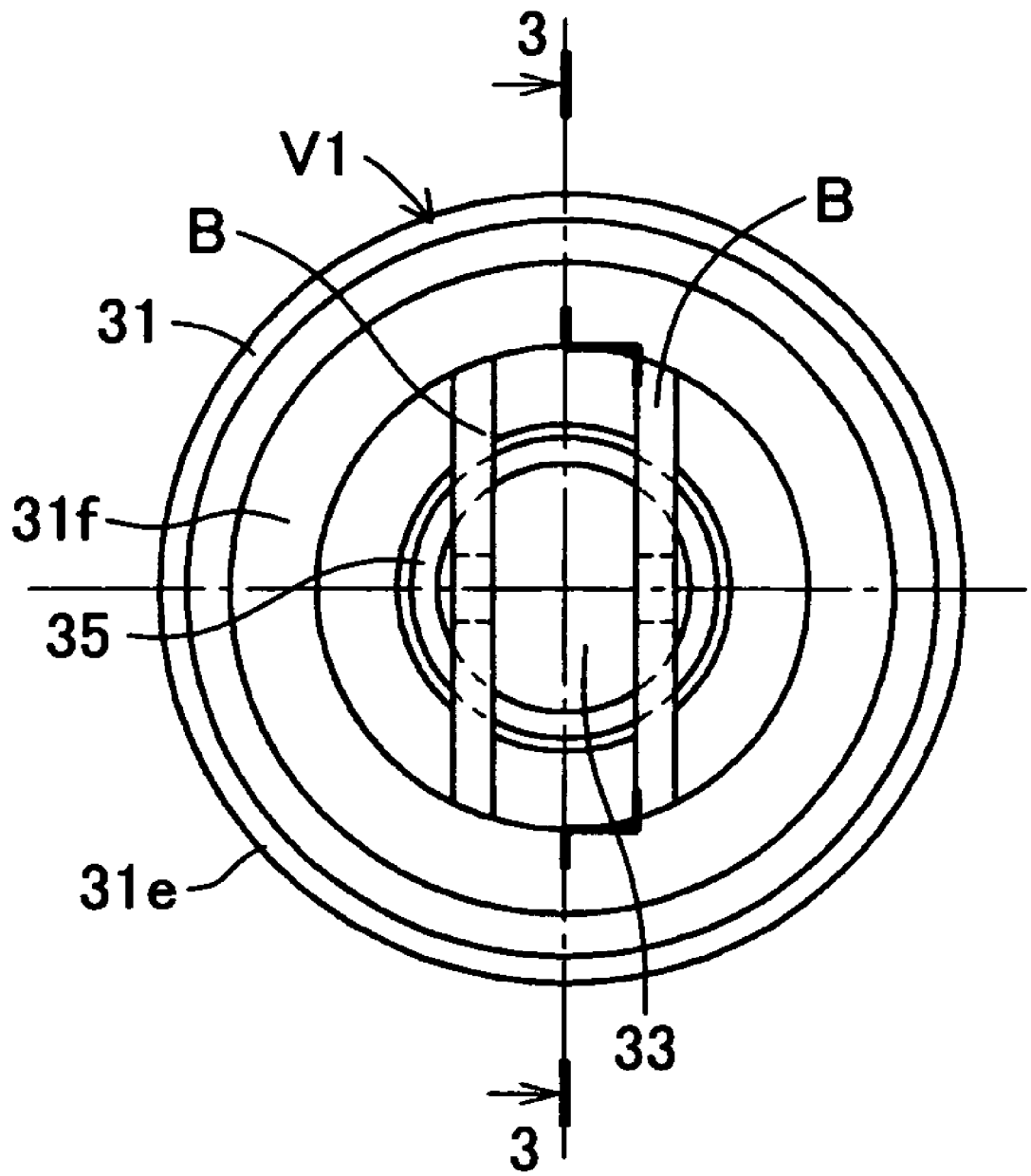
FIG. 4 is an enlarged elevation of the suction valve of FIG. 3 as seen from the pump chamber side, wherein line 3-3 indicates the plane along which the cross section shown in FIG. 3 is taken.
Figure 5:
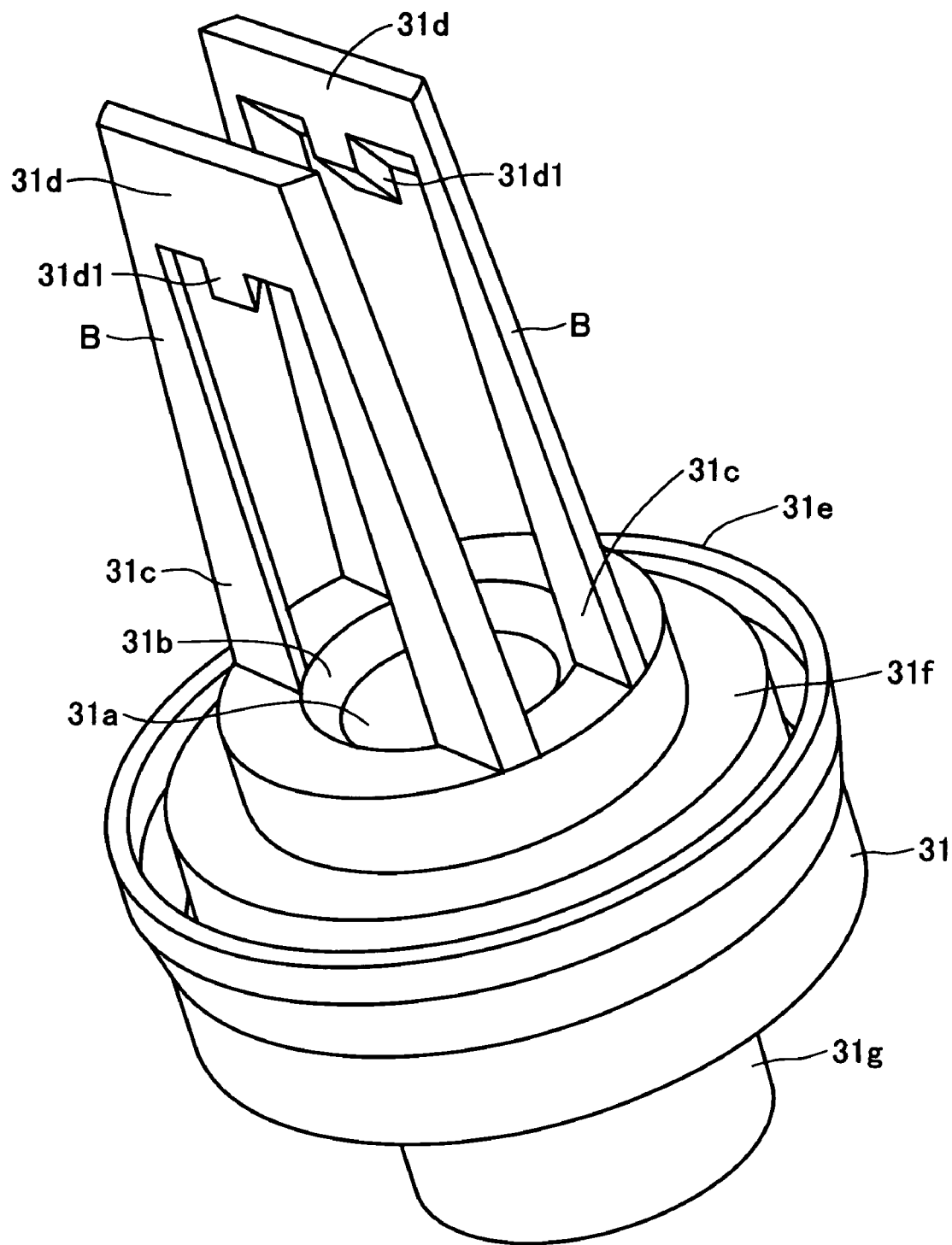
FIG. 5 is a perspective view of the retainer shown in FIG. 4.

FIGS. 3-5 illustrate a second embodiment of the piston pump according to the present invention. In this second embodiment, a cylinder member 13 and a piston 15 are mounted in a stepped bore 11c of a pump housing 11 having a suction port 11a and a discharge port 11b. A suction valve V1 and a discharge valve V2 are also mounted inside the stepped bore 11c. In this second embodiment, the shape of the retainer 31 in the suction valve V1 differs from the shape of the retainer 31 in the above-described first embodiment, but the structural features are the same as those of the above-described first embodiment, so portions having the same structure are shown by the same symbols, and an explanation of those portions will be omitted.

The retainer 31 in the suction valve V1 of this second embodiment has a valve bore 31a which is connected to the suction port 11a, a valve seat 31b which is formed on the end of the valve bore 31a closest to the pump chamber, and a valve body holding portion 31c and a spring holding portion 31d which are connected to and integrally formed with the valve seat 31b. The retainer 31 also includes an annular lip seal 31e, an annular receiving portion 31f, and a cylindrical portion 31g at the left end of the retainer 31 in FIG. 3 which fits in a liquid-tight manner into the connecting hole 15a of the piston 15 so as to be secured thereto.

The valve body holding portion 31c and the spring holding portion 31d comprise a pair of column-shaped members B (see FIGS. 4 and 5) which are formed in the shape of the letter C and are divided into two portions at their ends adjoining the valve seat. The left end in FIG. 3 of each column-shaped member B functions as a valve body holding portion 31c, and the right end in FIG. 3 of each column-shaped member B functions as a spring holding portion 31d. A latching portion (projecting portion) 31d1 which engages with one end of the spring 35 and prevents the spring 35 from coming loose from the retainer 31 is formed at the right end in FIG. 3 of each column-shaped member B which functions as a spring holding portion 31d.

An annular lip seal 31e is formed on the outer periphery of the retainer 31. It has a shape which prevents the flow of liquid from the pump chamber Ro toward the outer periphery of the piston 15. The annular receiving portion 31f is formed on the outer periphery of the retainer 31 closer to the pump chamber than is the lip seal 31e. It can receive the piston return spring 17 which returns the piston 15.

In this second embodiment having the above-described structure, each column-shaped member B is formed in the shape of a block C which is divided in two at its end adjoining the valve seat. Therefore, it is possible to improve moldability when forming the retainer 31 by resin molding and to increase the ease of removing the retainer 31 from a mold. In addition, the stiffness of each of the column-shaped members B can be increased compared to each of the column-shaped members A in the above-described first embodiment, so their holding ability (ability to hold the ball valve body 33 and the spring 35) can be increased. The operation and effects of this embodiment are otherwise essentially the same as those of the above-described first embodiment (except for the operation and effect of the tapered portions 31h), so an explanation thereof will be omitted.

Figure 6:
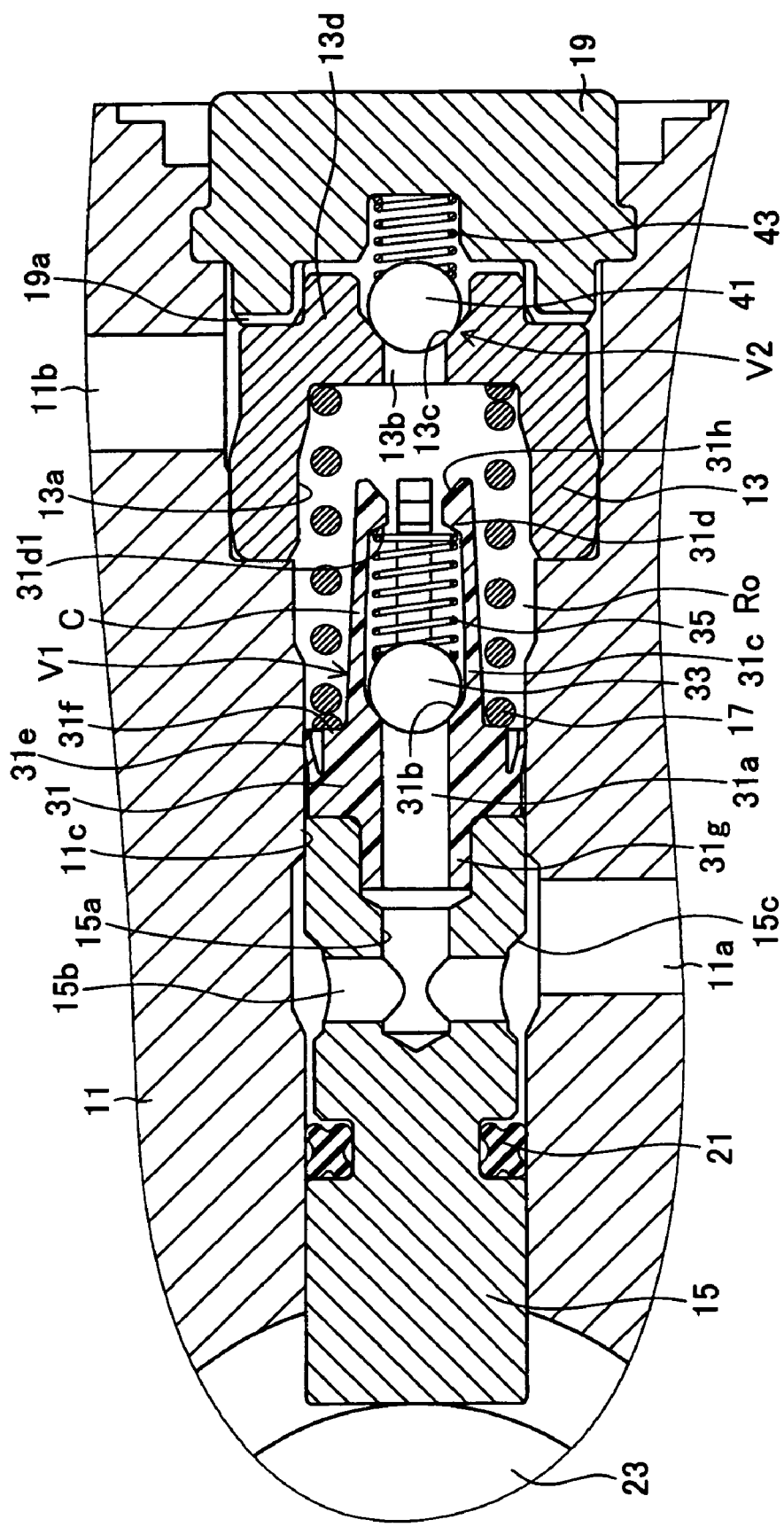
FIG. 6 is a longitudinal cross-sectional view of a third embodiment of a piston pump according to the present invention.
Figure 7:
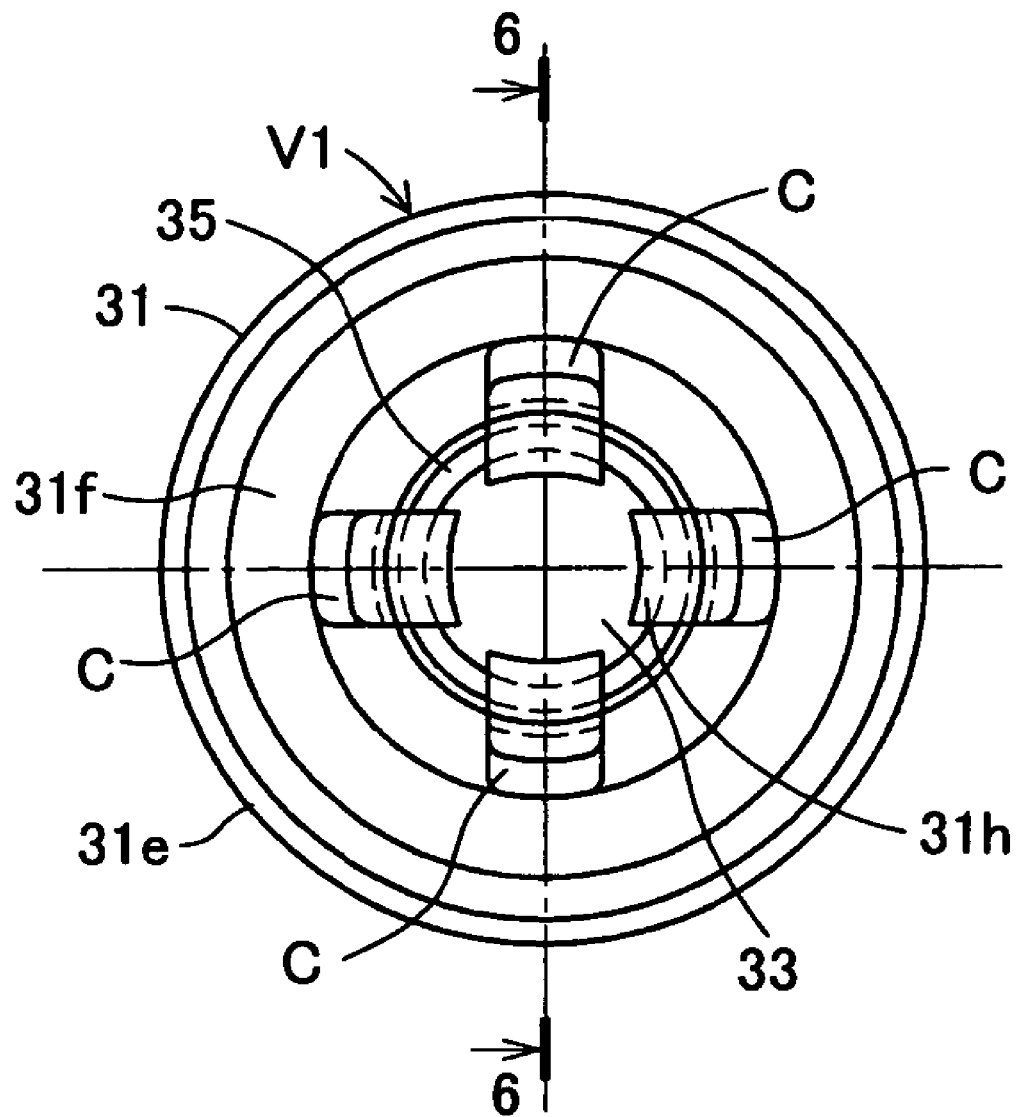
FIG. 7 is an enlarged elevation of the suction valve of FIG. 6 as seen from the pump chamber side, wherein line 6-6 indicates the plane along which the cross section shown in FIG. 6 is taken.
Figure 8:
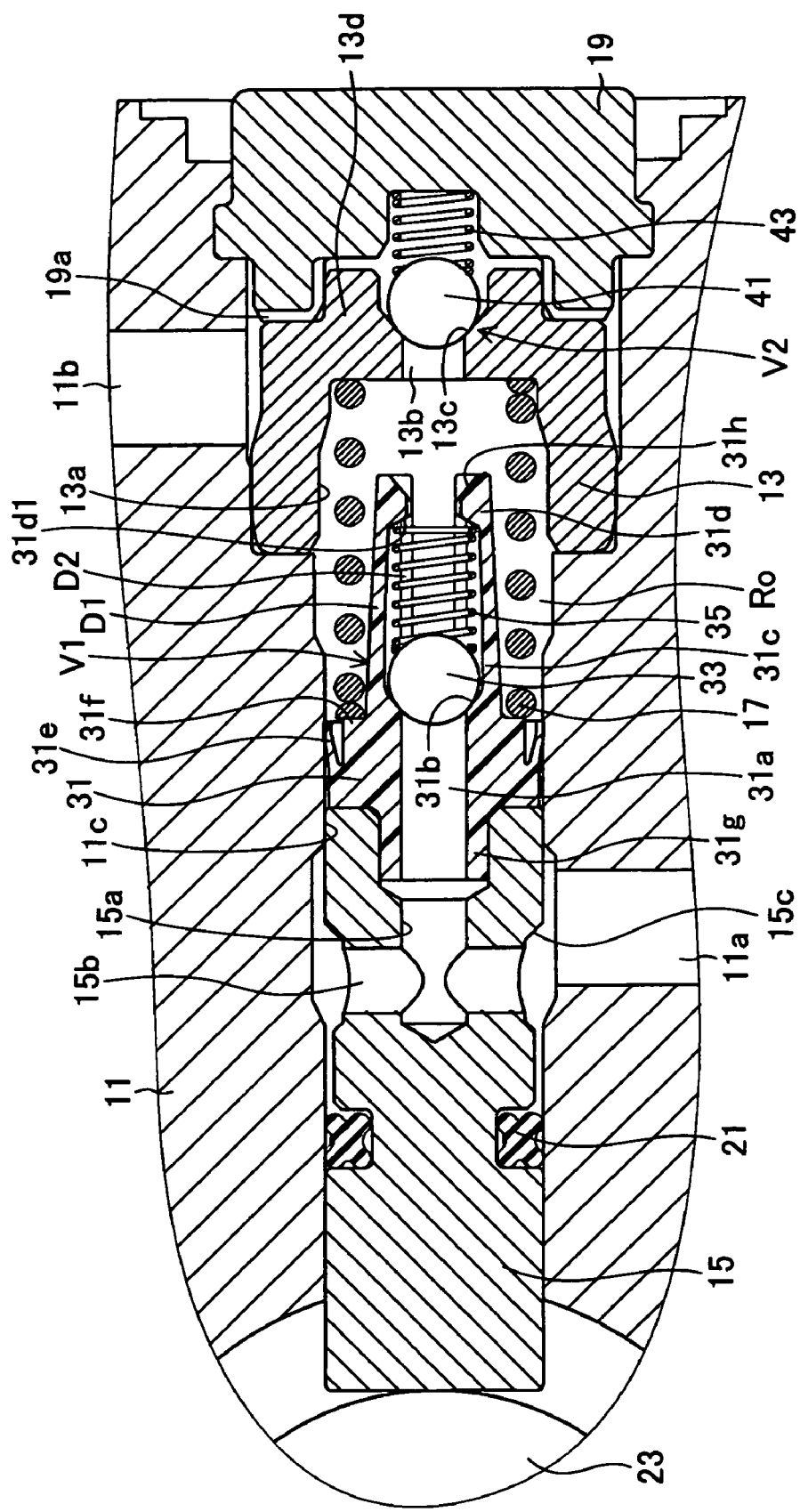
FIG. 8 is a longitudinal cross-sectional view of a fourth embodiment of a piston pump according to the present invention.
Figure 9:
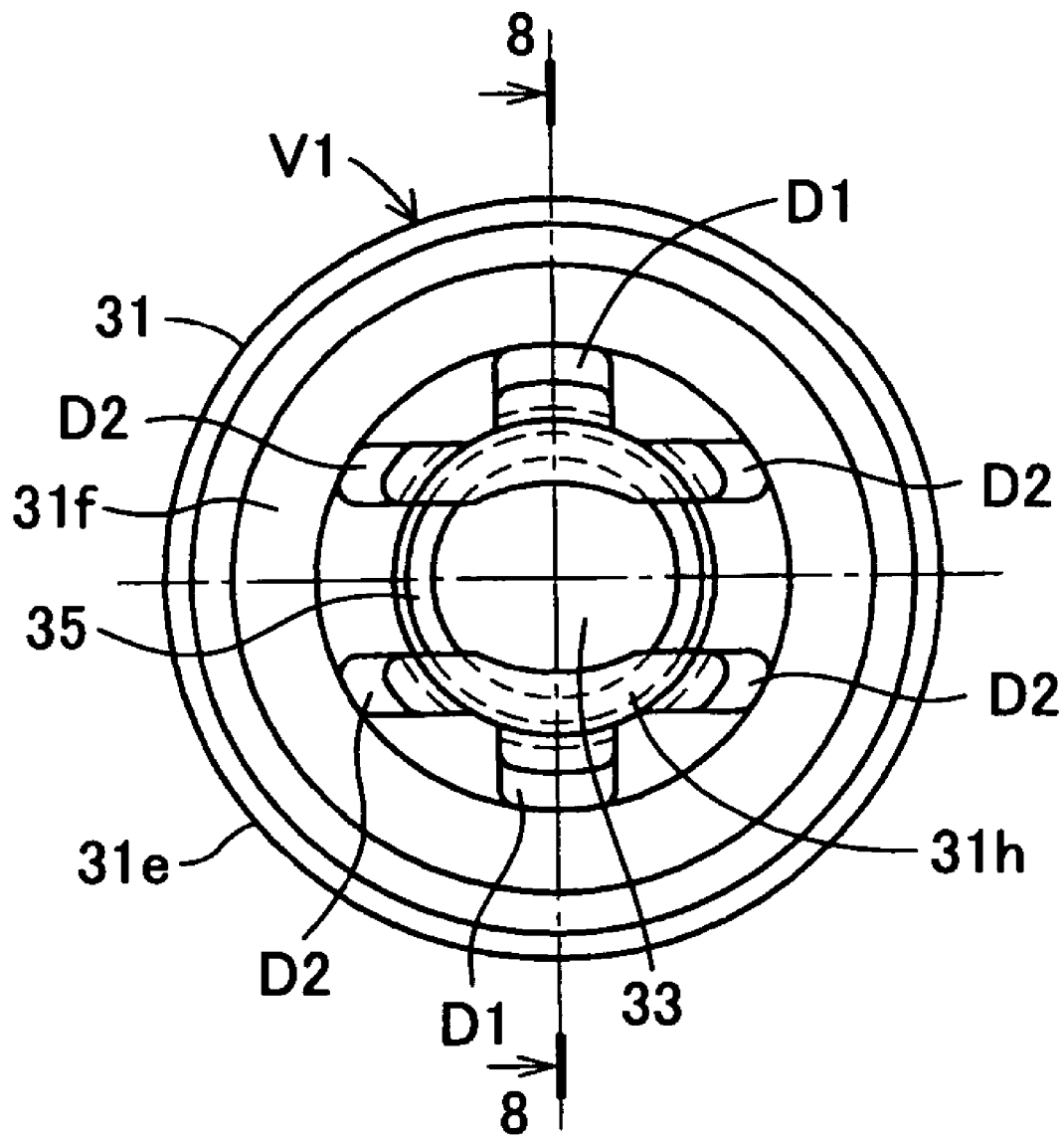
FIG. 9 is an enlarged elevation of the suction valve of FIG. 8 as seen from the pump chamber side, wherein line 8-8 indicates the plane along which the cross section shown in FIG. 8 is taken.
Figure 10:
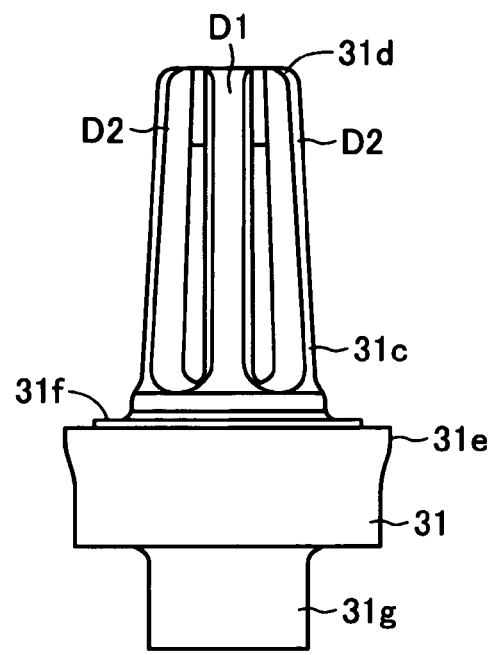
FIG. 10 is a front elevation of the retainer shown in FIG. 9.
Figure 11:
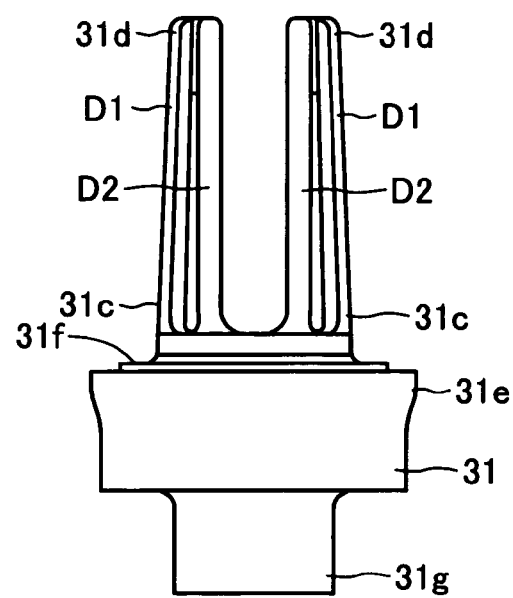
FIG. 11 is a side elevation of the retainer shown in FIG. 9.
Figure 12:
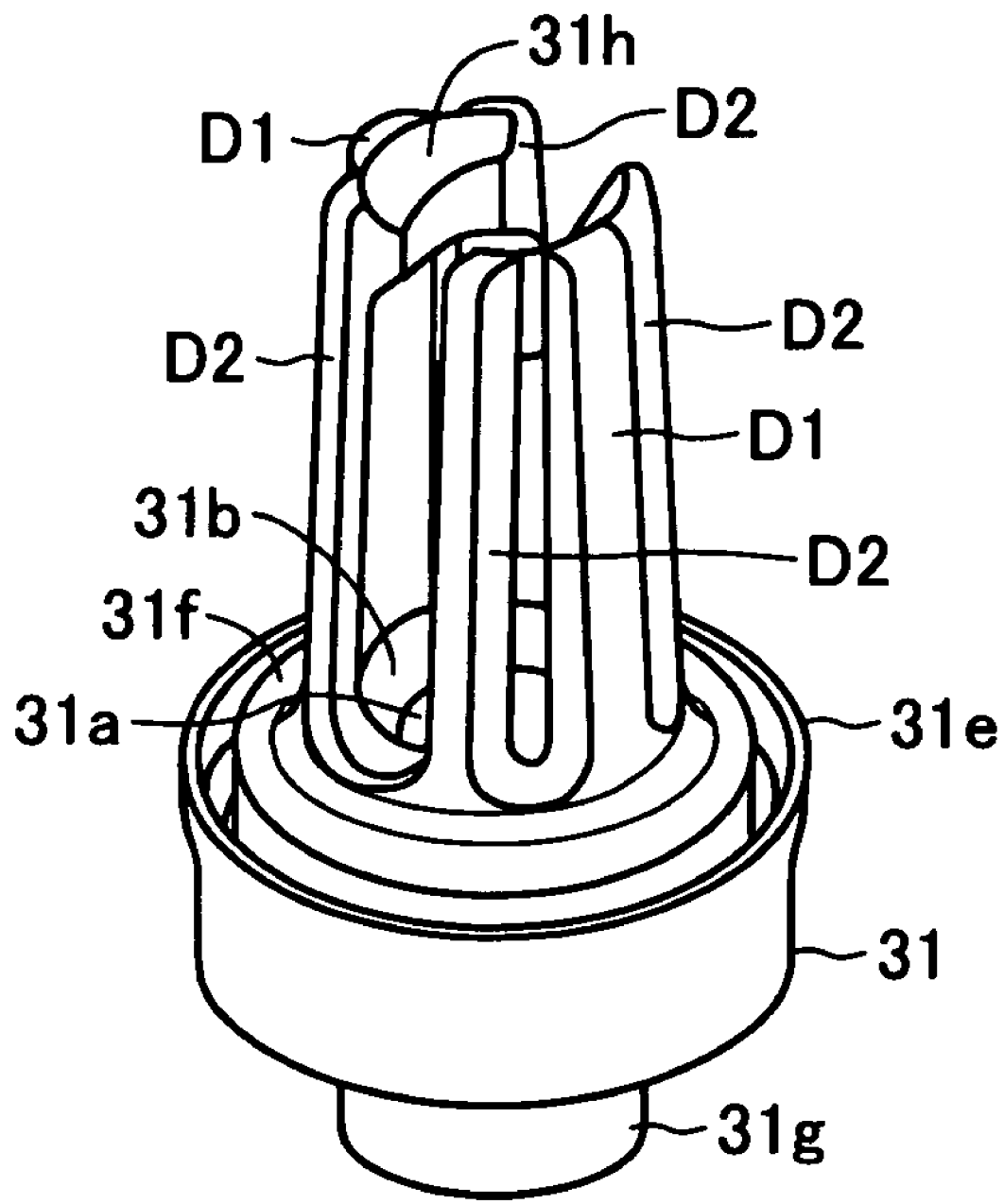
FIG. 12 is a perspective view of the retainer shown in FIG. 9.

FIGS. 6 and 7 show a third embodiment of the piston pump according to the present invention. In this third embodiment, a cylinder member 13 and a piston 15 are mounted in a stepped bore 11c of a pump housing 11 having a suction port 11a and a discharge port 11b. A suction valve V1 and a discharge valve V2 are also mounted in the stepped bore 11c. In this third embodiment, only the shape of the portion of the retainer 31 which engages with a spring 35 in the suction valve V1 (the shape of the end portions of column-shaped members C) is different from the shape (the shape of the end portions of the column-shaped members A) of the latching portions (hook portions) 31d1 of the retainer 31 of the above-described first embodiment, and other structural features are the same as those of the above-described first embodiment. Therefore, portions having the same structure are shown by the same symbols, and an explanation thereof will be omitted.

In the retainer 31 of the suction valve V1 of this third embodiment, the portions of the column-shaped members C which engage with the spring 35 are tapered portions (sloping surfaces) 31d1. Therefore, compared to the retainer 31 of the above-described first embodiment (in which portions of the column-shaped members which engage with the spring 35 are hook-shaped), the moldability of the retainer 31 which is formed by resin molding and the ease of removing the retainer 31 from a mold can be increased.

FIGS. 8-12 illustrate a fourth embodiment of the piston pump according to the present invention. In this fourth embodiment, a cylinder member 13 and a piston 15 are mounted in a stepped bore 11c of a pump housing 11 having a suction port 11a and a discharge port 11b. A suction valve V1 and a discharge valve V2 are also mounted in the stepped bore 11c. In this fourth embodiment, the shape of each column-shaped member of the retainer 31 of the suction valve V1 is different from the shape of each column-shaped member in the retainer 31 of the above-described third embodiment, but other structural features are the same as those of the above-described third embodiment. Therefore, portions having the same structure are shown by the same symbols, and an explanation of those portions will be omitted.

In the retainer 31 of the suction valve V1 of this fourth embodiment, instead of the four column-shaped members C of the third embodiment, six column-shaped members D1 and D2 are employed. The six column-shaped members are divided into two groups, with each group including one column-shaped member D1 and two column-shaped members D2 (see FIGS. 9-12). The end portions of the column-shaped members in each group, i.e., the end portions of one column-shaped member D1 and two column-shaped members D2 are connected together.

This structure makes it possible to improve the moldability of the retainer 31 when forming it by resin molding and to increase the ease of removing the retainer 31 from a mold. It is also possible to increase the stiffness of each of the column-shaped members D1 and D2 compared to the stiffness of column-shaped members C of the above-described third embodiment, whereby the holding performance of the column-shaped members (their ability to hold the ball valve body 33 and the spring 35) can be increased.

In the retainer 31 of the suction valve V1 of this fourth embodiment, a body formed by connecting the end portions of one column-shaped member D1 and two column-shaped members D2 to each other has a three-dimensional shape such that it becomes narrower towards its end portion compared to its base portion. Therefore, compared to the case in which a member formed from a plurality of column-shaped members has a two-dimensional shape (plate-like shape) as in the above-described third embodiment, the stiffness of the member can be increased, whereby it becomes more difficult to elastically deform the end portions of the column-shaped members D1 and D2 in the radially outward direction. As a result, the holding force exerted on the spring 35 by the end portions of the column-shaped members D1 and D2 can be increased.

In this fourth embodiment (an embodiment in which an even number of column-shaped members in a retainer 31 are divided into two groups and the ends of the column-shaped members in a group are connected to each other), the number of column-shaped members is not limited to six, and the number of column-shaped members may be four or an even number greater than or equal to 8.

In each of the above-described embodiments, the case was described in which a narrow groove (a groove through which air can easily pass but through which liquid cannot easily pass) extending in the axial direction is not formed in the outer periphery of the valve seat 31b and the lip seal 31e of the retainer 31, but when carrying out the present invention, it is possible to form an axially extending narrow groove on the valve seat 31b of the retainer 31 (see groove 31b1 of FIG. 13, for example) to run along the surface of the valve seat 31b, or to form an axially extending narrow groove on the outer periphery of the lip seal 31e (see groove 31e1 in FIG. 13, for example) to run along the outer surface of the lip seal 31e. With this structure, at the time of removing air when filling the piston pump with liquid (at the time of drawing a vacuum), it is possible to remove air remaining in the pump chamber Ro through these narrow grooves (grooves 31b1 and 31e1 of FIG. 13).

Figure 13:
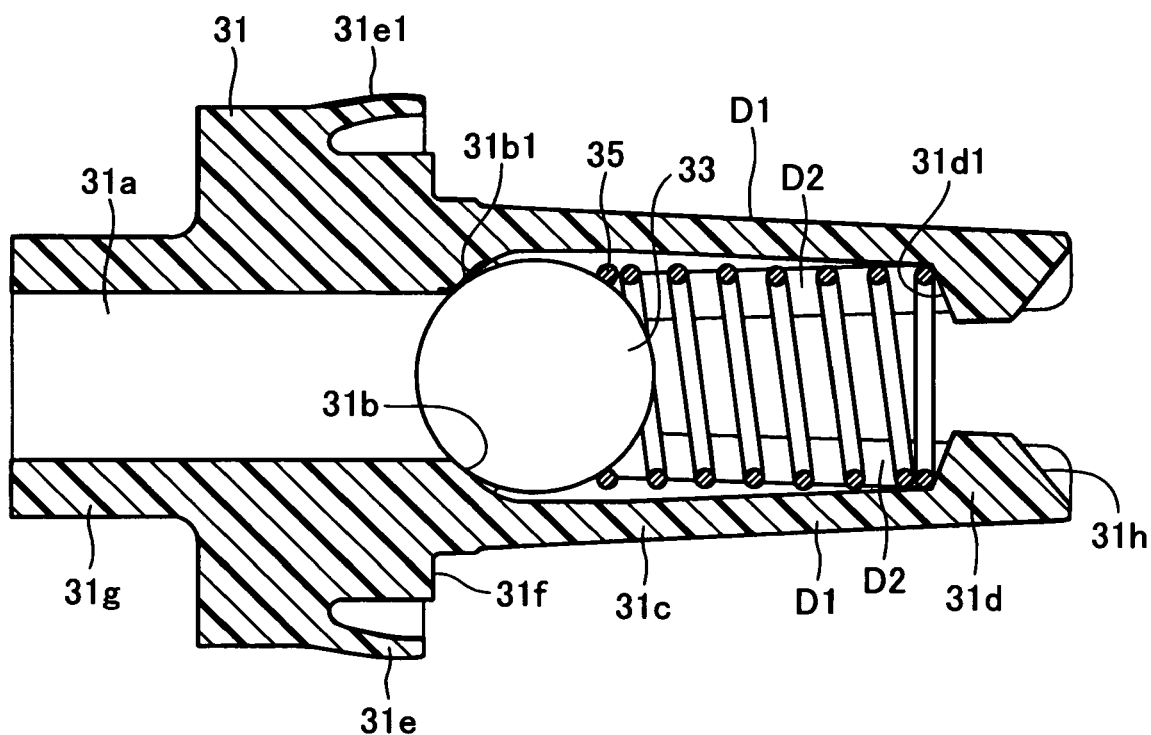
FIG. 13 is a longitudinal cross-sectional view of a variation of the fourth embodiment showing the relationship between the retainer, the ball valve body, and the spring in the suction valve.
Figure 14:
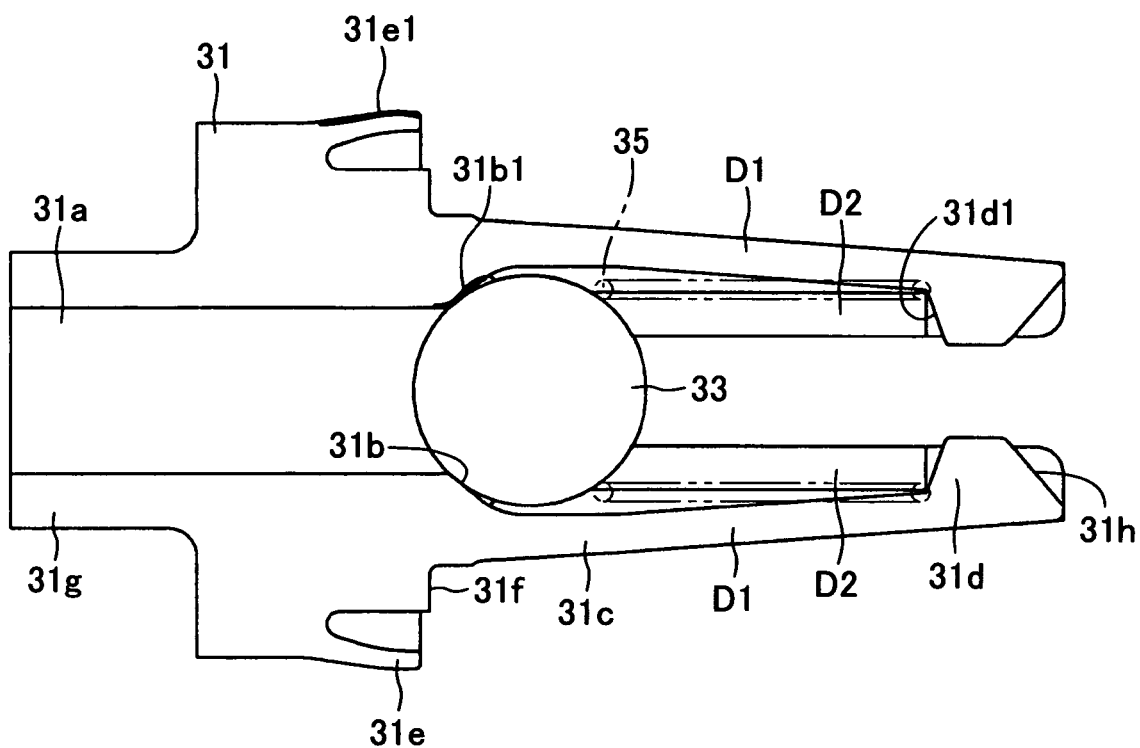
FIG. 14 is a simplified longitudinal cross-sectional view showing the relationship between the retainer and the ball valve body prior to mounting the spring on the retainer shown in FIG. 13.
Figure 15:
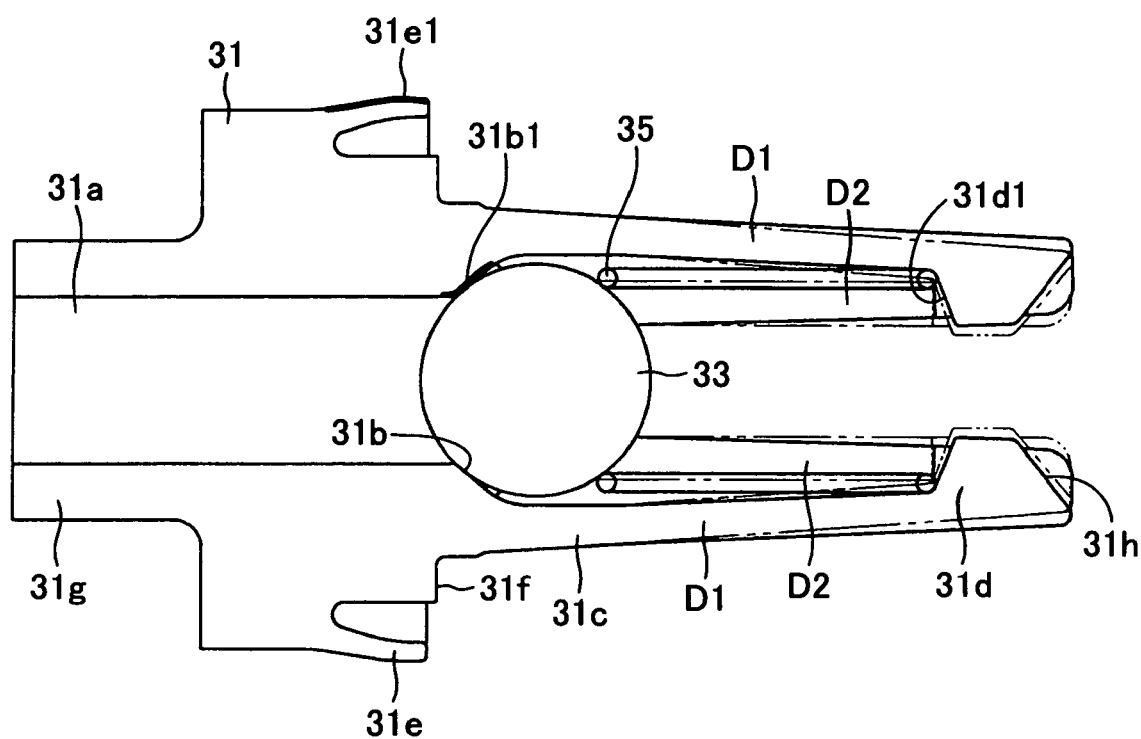
FIG. 15 is a simplified longitudinal cross-sectional view showing the shape of the retainer in a state prior to mounting the spring on the retainer shown in FIG. 13 by dashed lines and showing the relationship among the retainer, the ball valve body, and the spring in a state in which the spring is mounted on the retainer by solid lines.

In the above-described third and fourth embodiments, the end portion of a coil spring 35 having a cylindrical shape engages with the midportion of a tapered portion 31d1 formed at the end portion of each column-shaped member (C or D1 and D2), but as shown in FIGS. 13-15 which illustrate a variation of the fourth embodiment, the inner diameter of each of the column-shaped members D1 and D2 as measured at the larger diameter ends of the tapered portions 31d1 formed on the ends of each of the column-shaped members D1 and D2 can be made smaller by a prescribed amount than the outer diameter of the end portion of the coil spring 35 in a state before the ball valve body 33 and the coil spring 35 are inserted into the retainer 31 (a state shown by solid lines in FIG. 14 and by dashed lines in FIG. 15). With this structure, when the coil spring 35 is mounted on the column-shaped members D1 and D2 of the retainer 31, the end portion of each column-shaped member D1 and D2 is elastically deformed in the radially outward direction as shown in FIG. 15. As a result, the end portions of each of the column-shaped members D1 and D2 press the end portion of the coil spring 35 from the outer periphery towards the inner periphery thereof with a radially inward elastic restoring force. Accordingly, the coil spring 35 is held by the retainer 31 with certainty and is prevented from coming loose from the retainer 31. In FIGS. 14 and 15, in order to clearly show the relationship between the end portions of each of the column-shaped members D1 and D2 and the coil spring 35, only the outline of the retainer 31 is shown without employing cross-sectional hatching, and only lines indicating the inner and outer diameter of the coil spring 35 are shown.

In each of the above-described embodiments, the case was described in which the piston pump is a typical piston pump, but the effects of the present invention can be similarly obtained in the case in which the piston pump is a self-priming pump of the type disclosed in Japanese Patent No. 3278982.

What is claimed is:

1. A piston pump comprising:
    a pump housing having a suction port and a discharge port;
    a piston which is mounted in a bore of the housing and forms a pump chamber, the piston increasing and decreasing the volume of the pump chamber by reciprocating in the axial direction;
    a suction valve which is provided on the piston and is disposed in an inflow passage connecting the suction port with the pump chamber and which opens when the volume of the pump chamber is increasing and closes when the volume is decreasing; and
    a discharge valve which is provided on a discharge side of the pump chamber, the discharge side of the pump chamber being the side toward which the piston moves to decrease the volume of the pump chamber, the discharge valve being disposed in an outflow passage connecting the discharge port with the pump chamber and which opens when the volume of the pump chamber is decreasing and closes when the volume is increasing, wherein liquid flows from the suction port towards the discharge port when the piston reciprocates in the axial direction and the volume of the pump chamber increases and decreases, wherein the suction valve comprises:
    a retainer which is mounted on the piston and includes a valve bore which communicates with the suction port, a valve seat which is formed on the end of the valve bore closest to the pump chamber, and a valve body holding portion and a spring holding portion which are connected to and seamlessly and integrally formed with the valve seat, wherein the valve body holding portion, the spring holding portion, and the valve seat are molded out of a resin into a single piece;
    a valve body which is received and held by the valve body holding portion of the retainer and can seat and unseat with respect to the valve seat; and a spring which is received and held by the spring holding portion and which biases the valve body towards the valve seat;
    wherein the valve body holding portion and the spring holding portion of the retainer comprise a plurality of column-shaped members which extend in the axial direction of the retainer;
    each column-shaped member having an end portion, an end of the end portion closest to the discharge side of the pump chamber and a tapered portion which is formed on an inner periphery of the end portion and which decreases in inner diameter from a larger diameter end of the tapered portion toward the end of the column-shaped member closest to the discharge side of the pump chamber; and
    the spring comprising a coil spring possessing a cylindrical shape, the inner diameter of the column-shaped members as measured at the larger diameter ends of the tapered portions is smaller than the outer diameter of the end of the coil spring before the valve body and the coil spring are positioned in the retainer.

2. A piston pump as claimed in claim 1, including an even number greater than or equal to 4 of the column-shaped members, wherein the column-shaped members are divided into two groups, with the column-shaped members in each group being connected together at the end portions of the column-shaped members.

3. A piston pump as claimed in claim 2 wherein each group of column-shaped members whose end portions are connected together forms a three-dimensional body which becomes narrower towards its end portion compared to its base portion.

4. A piston pump as claimed in claim 1 wherein an annular lip seal which prevents liquid from flowing from the pump chamber towards the outer periphery of the piston is formed on the outer periphery of the retainer.

5. A piston pump as claimed in claim 4 wherein a receiving portion for receiving a piston return spring which returns the piston is formed on the outer periphery of the retainer at a location closer to the pump chamber than is the lip seal.

\* \* \* \* \*